United States Patent [19]
Boggs

[11] Patent Number: 5,425,401
[45] Date of Patent: Jun. 20, 1995

[54] CONTAINER FOR USED MOTOR OIL FROM OIL FILTERS

[76] Inventor: Delbert A. Boggs, 90812 Alvadore Rd., Junction City, Oreg. 97448

[21] Appl. No.: 102,209

[22] Filed: Aug. 5, 1993

[51] Int. Cl.⁶ .............................................. B65B 3/00
[52] U.S. Cl. .................................... 141/98; 141/364; 141/375; 141/322; 220/571; 184/106
[58] Field of Search .......................... 141/98, 363–366, 141/375, 319–322; 184/1.5, 106; 220/571, 571.1, 573; 248/311.3

[56] References Cited

U.S. PATENT DOCUMENTS

| | | | |
|---|---|---|---|
| 2,807,290 | 9/1957 | Hearn . | |
| 3,387,621 | 6/1968 | Schaff | 184/1.5 X |
| 4,020,922 | 5/1977 | Klasel | 184/1.5 |
| 4,253,504 | 3/1981 | Rosen | 141/106 |
| 4,376,703 | 3/1983 | Krauss | 210/238 |
| 4,702,290 | 10/1987 | Perez | 141/332 |
| 4,832,095 | 5/1989 | Bonnell | 141/98 X |
| 4,909,205 | 3/1990 | Bewley, III | 184/1.5 X |
| 5,249,608 | 10/1993 | Hua | 141/363 X |

*Primary Examiner*—J. Casimer Jacyna
*Attorney, Agent, or Firm*—James D. Givnan, Jr.

[57] ABSTRACT

A container for the collection of oil from a used automotive oil filter with the container having a lid structure with a projecting tubular inlet to which the used filter is threadedly attached. Oil, draining from the filter, enters the container by openings in the container lid. During draining of the filter oil is confined for passage through the openings by a resilient gasket of the filter abutting a circular surface area of the lid. A spout affixed to the side of the container receives container contents discharged through the openings when the container is later emptied, The container receives the used oil filter in a fluid tight manner to permit drainage over a period of time without risk of spillage regardless of upset of the joined container and filter.

2 Claims, 1 Drawing Sheet

CONTAINER FOR USED MOTOR OIL FROM OIL FILTERS

BACKGROUND OF THE INVENTION

The present invention is generally concerned with receptacles for the collection of used motor oil. During the changing of oil in an automotive engine by the car owner it is customary to replace the engine oil filter which should be drained prior to disposal. Filters by their construction take considerable time to drain and hence disposal often occurs with the filter still having a quantity of oil which ultimately ends up contaminating a landfill.

U.S. Pat. No. 4,702,290 is of interest in that it shows a pan for receiving oil from an engine with the pan having a pair of guides on the pan wall for the reception of a used oil filter to hold same upright during pouring of the used oil into a disposable container. In use, the filter would have its exterior submerged in used oil which should be wiped away prior to disposal. The pan requires a cover to be installed thereon prior to draining.

SUMMARY OF THE PRESENT INVENTION

The present invention is embodied in a collector for used oil from engine oil filters to assure oil removal prior to filter disposal.

The collector includes a receptacle, includes a lid structure from which projects a threaded inlet which is screwed into the used oil filter. A raised, annular surface of the lid cooperates with the resilient gasket of the oil filter to confine oil for passage downwardly into the collector. Openings in the lid structure, located inward of the annular surface of the lid structure, receive oil from like openings in the filter which is inverted after screwed attachment of the collector. A spout on the collector facilitates pouring of collector contents into a disposal container of the approved type.

Important objectives of the present invention include the provision of a collector for engine oil from used oil filters which permits sealed attachment of the oil filter to permit filter draining over a long period of time without risk of spilling even if the collector and attached filter are accidentally tipped over; the provision of a collector which enables complete draining of an oil filter and the tidy discharge of the oil drained into a throw-away receptacle.

DETAILED DESCRIPTION OF THE PREFERRED EMBODIMENTS

Figure 1:
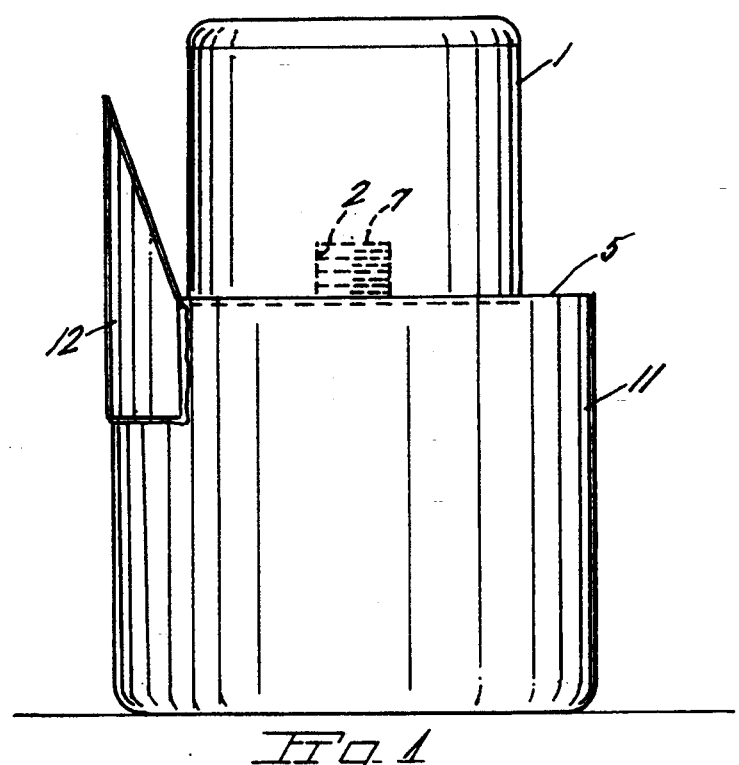
FIG. 1 is an elevational view of the present container receiving oil from a used oil filter.
Figure 2:
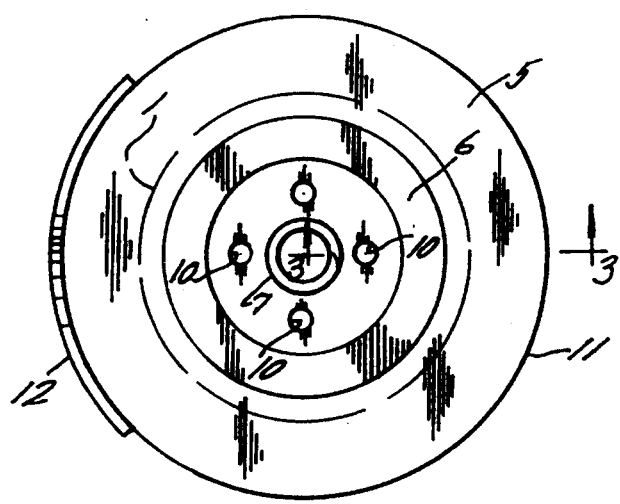
FIG. 2 is a top plan view of the present container with the filter removed.
Figure 3:
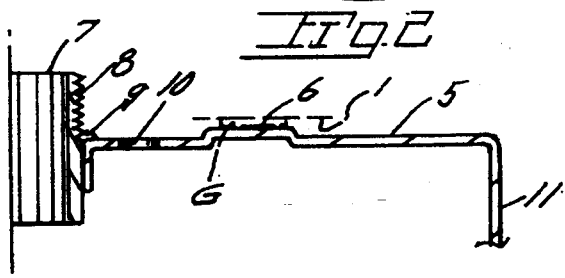
FIG. 3 is a vertical sectional view of the lid structure of the container taken along line 3—3 of FIG. 2.
Figure 4:
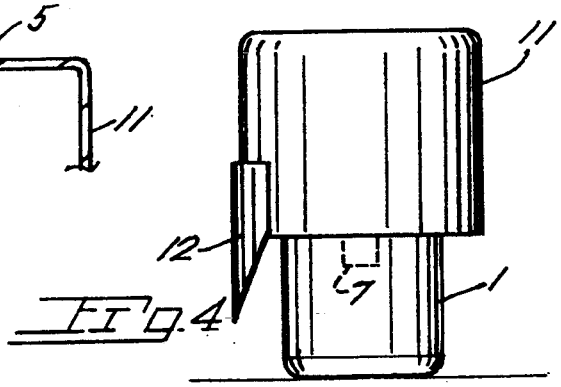
FIG. 4 is an elevational view of the present container attached to a used oil filter prior to draining of the filter.

With continuing attention to the drawings, the reference numeral 1 indicates an oil filter removed from an automotive engine. Typically such filters have a centrally located threaded bore 2 for screwed attachment to the engine oil outlet on the engine block. Such filters include a resilient gasket at G (FIG. 3).

The present used oil container includes a lid structure at 5 having a raised annular Surface at 6 against which seats the resilient gasket G of the used oil filter.

Centrally located in lid structure 5 is a threaded inlet 7 with external threads 8 for reception of the internal threads 2 of the filter. Container inlet 7 may be soldered at 9 for securement to container lid 5.

Radially offset from container inlet 7 and located inward from annular surface 6, are a series of openings 10 through which oil passes. During draining of oil from a filter the oil is confined by the seating of the gasket G on annular surface 6.

A side wall 11 of the container carries a spout 12.

As the combined filter and used oil container are a fluid tight combination, the Same may be left attached for complete draining of the filter of the period between oil changes, which may be a matter of months. Prior to further use of the present container, the old filter is removed with only that oil remaining being that absorbed by oil filtering components of the filter. Prior to reuse of the container the same is emptied via spout 12 into a suitable disposable container for used oil. The present container permits the draining of an engine oil filter over a lengthy period of weeks or months without risk of spillage even if accidentally upset during this period.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A free standing manually invertible container for the collection of engine oil in a fluid tight manner drained from a used automotive oil filter removed from in engine and having a gasket, said container including, an upper lid structure, a bottom wall and a side wall with an upper edge, said side wall connecting the upper lid structure to the bottom wall, said lid structure having a tubuler inlet projecting therefrom with external screw threads and which upon being inverted may be threadedly attached to the automotive oil filter and then reinverted and placed on said bottom wall for the discharge of used oil from the attached filter, openings in the lid structure disposed about said inlet for the passage of used oil into the container, an annular sealing surface offset radially from said openings and against which the oil filter gasket may abut when attached to the container during draining of used oil from the filter, a spout extending along only a portion of the perimeter of the upper edge of said side wall and projecting upwardly beyond said lid structure for draining oil from the container after the filter is removed.

2. The container claimed in claim 1 wherein said annular sealing surface is a raised surface.

* * * * *